(12) United States Patent
Darcie et al.

(10) Patent No.: US 6,195,362 B1
(45) Date of Patent: *Feb. 27, 2001

(54) RESOURCE POOLING SYSTEM AND METHOD IN COMMUNICATION SYSTEMS

(75) Inventors: Thomas Edward Darcie; Alan H. Gnauck, both of Middletown; Xiaolin Lu, Matawan, all of NJ (US)

(73) Assignee: AT&T Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/745,764

(22) Filed: Nov. 8, 1996

(51) Int. Cl.[7] ............................................... H04J 3/16
(52) U.S. Cl. ............................................ 370/431; 370/449
(58) Field of Search ........................... 370/431, 434, 370/442, 510, 516, 462, 444, 445, 447, 449, 450, 451, 454, 455, 456, 459, 461, 441, 535, 537, 480, 458, 407, 408, 254, 256, 347, 345, 465; 455/17, 77, 509, 517; 340/825.08, 825.5, 825.51, 825.52; 359/135, 136, 123, 115, 113, 118

(56) References Cited

U.S. PATENT DOCUMENTS

| | | | |
|---|---|---|---|
| 4,625,308 | * 11/1986 | Kim et al. | 370/321 |
| 4,638,479 | 1/1987 | Alexis | 370/95 |
| 4,768,188 | * 8/1988 | Barnhart et al. | 370/434 |
| 4,783,779 | 11/1988 | Takahata et al. | 370/69.1 |
| 4,789,980 | 12/1988 | Darcie et al. | |
| 5,210,771 | 5/1993 | Schaeffer et al. | 375/1 |
| 5,293,382 | 3/1994 | Carson et al. | 370/123 |
| 5,416,778 | 5/1995 | Chan et al. | 370/95.1 |
| 5,428,608 | 6/1995 | Freeman et al. | |
| 5,448,752 | 9/1995 | Mabey | 455/33.1 |
| 5,497,424 | 3/1996 | Vanderpool | 380/34 |
| 5,546,383 | 8/1996 | Cooley et al. | |

FOREIGN PATENT DOCUMENTS 0 695 092 A1 1/1996 (EP).
0 713 347 A2 5/1996 (EP).

OTHER PUBLICATIONS

European Search Report.

* cited by examiner

Primary Examiner—Dang Ton
(74) Attorney, Agent, or Firm—Oliff & Berridge, PLC

(57) ABSTRACT

This invention provides a method and apparatus for allocating pools of resources of a communication system to nodes and end users serviced by the nodes. The nodes are coupled to a communications network through interface units. The interface units are organized as a pool and may be either preassigned to each of the nodes or may be dynamically allocated to the nodes based on end user requests. All the nodes of the communication system uses a common frequency band. Each of the nodes is coupled to the communication network through a dedicated channel. Thus, bandwidth available to the end users are greatly expanded without expensive and complex upgrades to existing equipment.

31 Claims, 13 Drawing Sheets

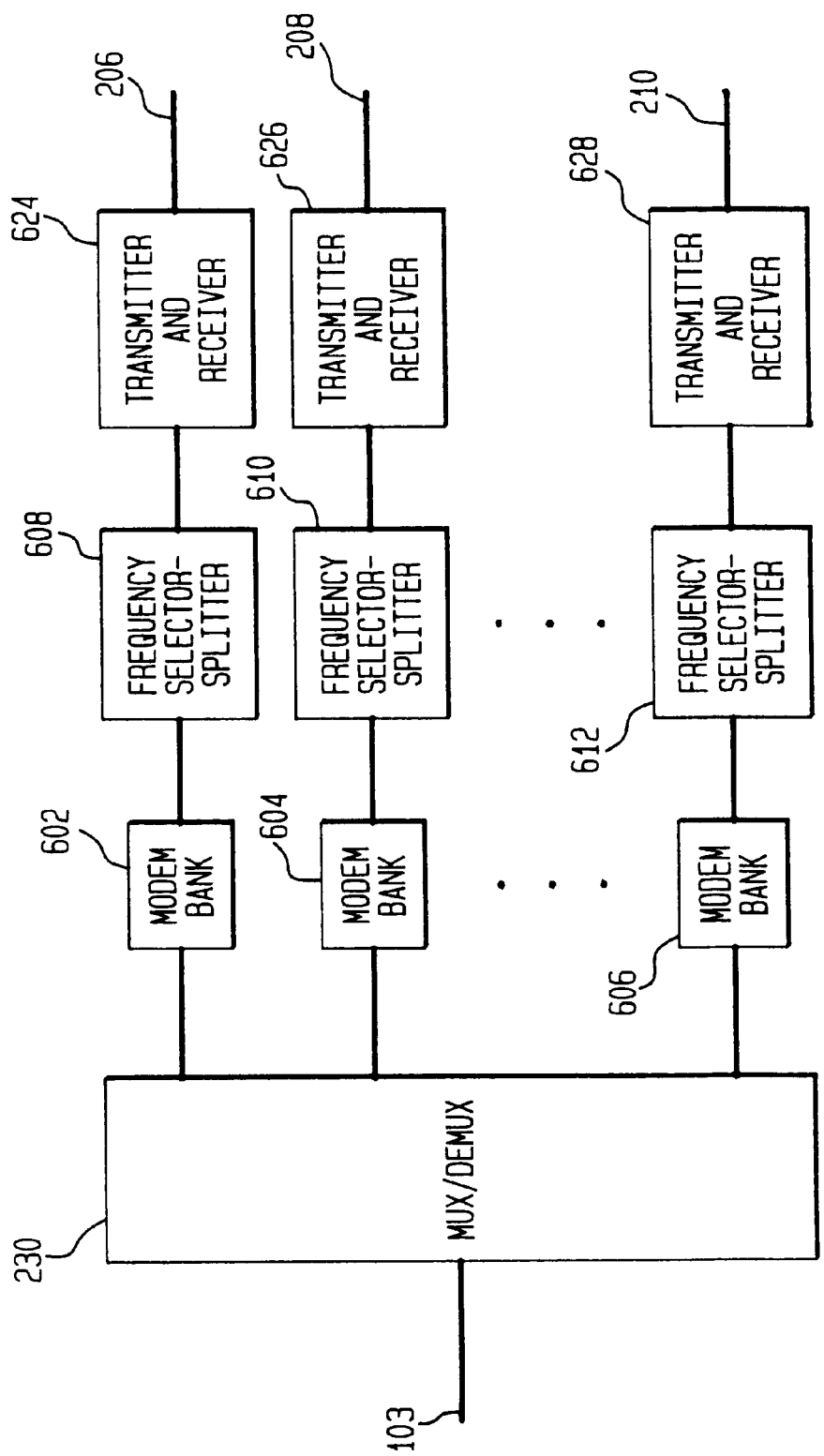

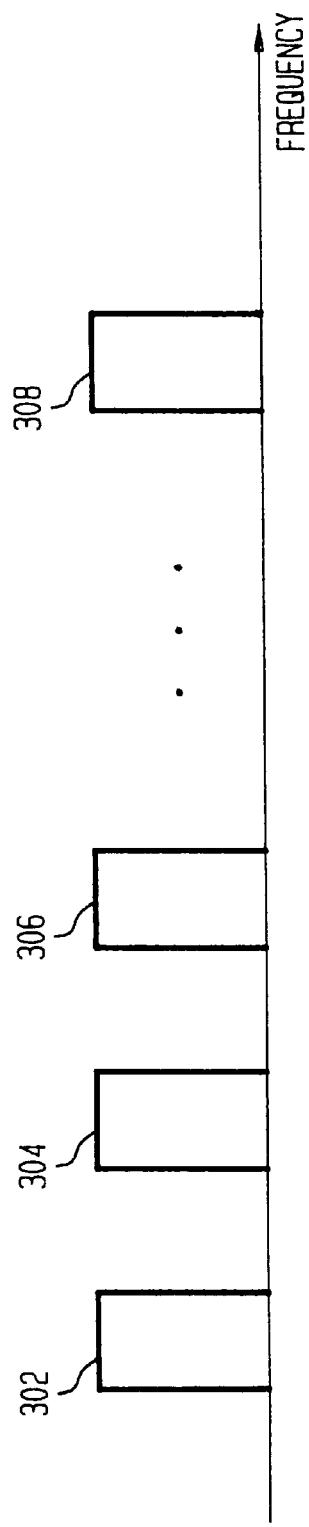
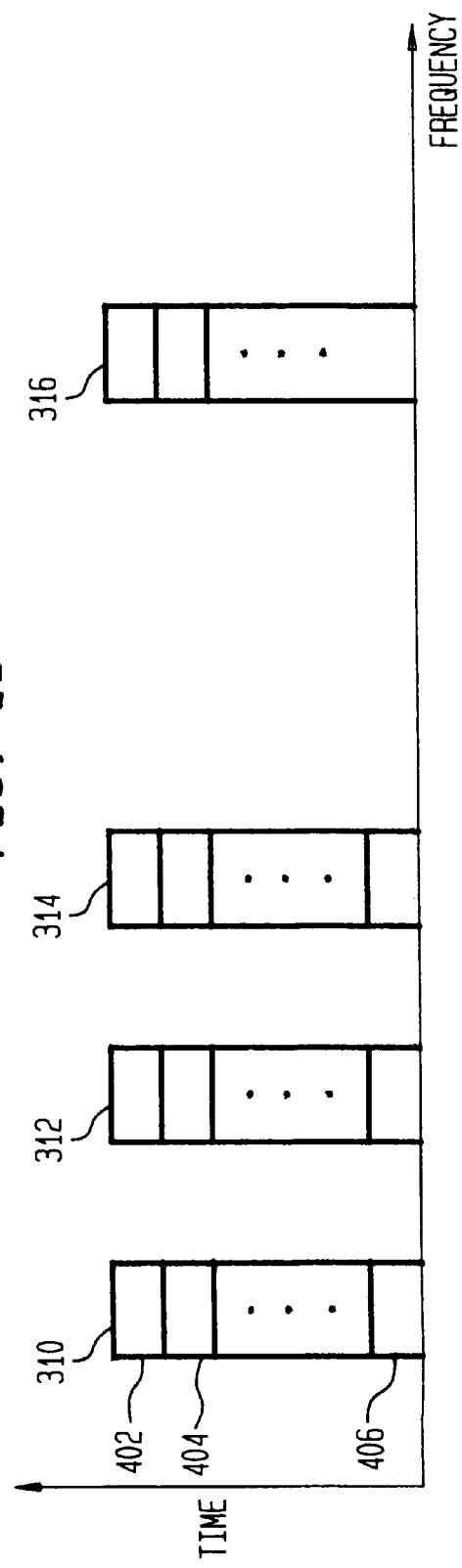

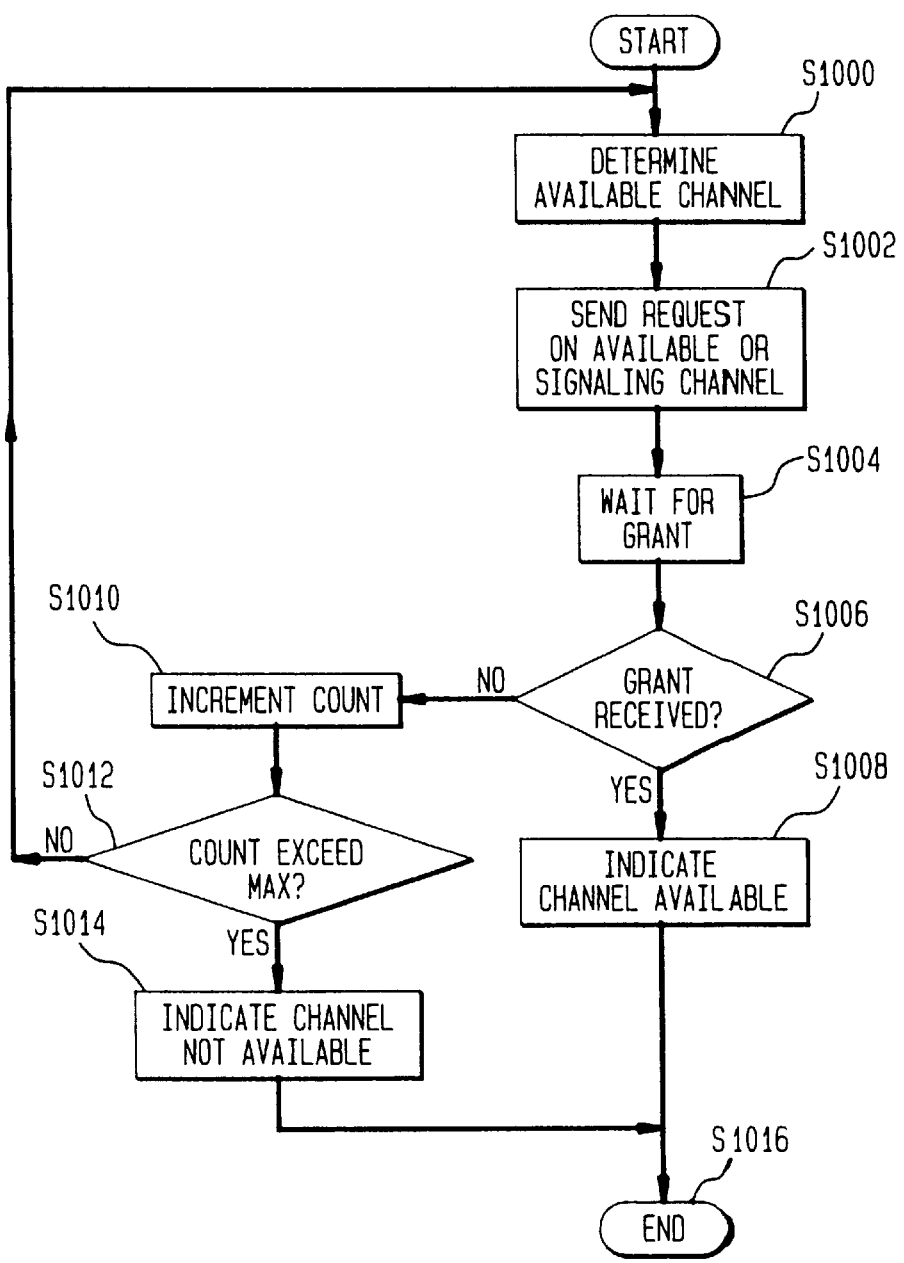

RESOURCE POOLING SYSTEM AND METHOD IN COMMUNICATION SYSTEMS

BACKGROUND OF THE INVENTION

1. Field of the Invention

This invention relates to a system and method for sharing resources in a communication system.

2. Description of Related Art

While present communication systems provide adequate bandwidth to meet present demand for communication services, current communication infrastructure capacity may be exhausted in the near future as demand increases for data, entertainment and voice communications. Because of the high cost of equipment upgrades, new techniques are needed to exploit resources available in current systems or resources of anticipated system upgrades to further increase bandwidth availability either without costly additional equipment or permitting upgrades to be added in small increments as additional capacity is required.

SUMMARY OF THE INVENTION

This invention provides a method and apparatus for pooling resources of a communication system to support nodes and end users serviced by the nodes. The nodes are coupled to a communications network through interface units that are organized into resource structures such as a pool. The interface units of the pool may be either preassigned to each of the nodes or may be allocated to the nodes based on end user requests.

Communication channels are also organized into structures such as pools. End users may acquire communication services by requesting a channel. A channel may be a frequency channel of a frequency division multiplexing protocol or a time slot of a frequency channel such as provided by time division multiplexing protocol. Each end user may be either preassigned a channel or all the channels of a node may be organized into a pool and the channels are assigned to each end user as the user issues a request.

The frequency bands used by the nodes may also be pooled. The nodes may be assigned different frequency bands from all available frequency ranges or all the nodes may share a common frequency band which is the combination of all the available frequency ranges. Each of the nodes is coupled to the backbone communication network through at least one dedicated channel. Thus, the bandwidth available to the end users is greatly expanded without expensive and complex upgrades to existing equipment.

BRIEF DESCRIPTION OF THE DRAWINGS

The invention will be described in connection with the following figures wherein like numerals represent like elements, and wherein:

FIG. 10 is a diagram of another modem bank organization for the head-end of FIG. 6;

FIG. 12 is a diagram of frequency channels of a frequency division multiplexed protocol;

FIG. 13 is a diagram of frequency channels of FIG. 12 also having time division multiplexed channels;

FIG. 16 is a flow chart of a channel request process.

DETAILED DESCRIPTION OF PREFERRED EMBODIMENTS

Figure 1:
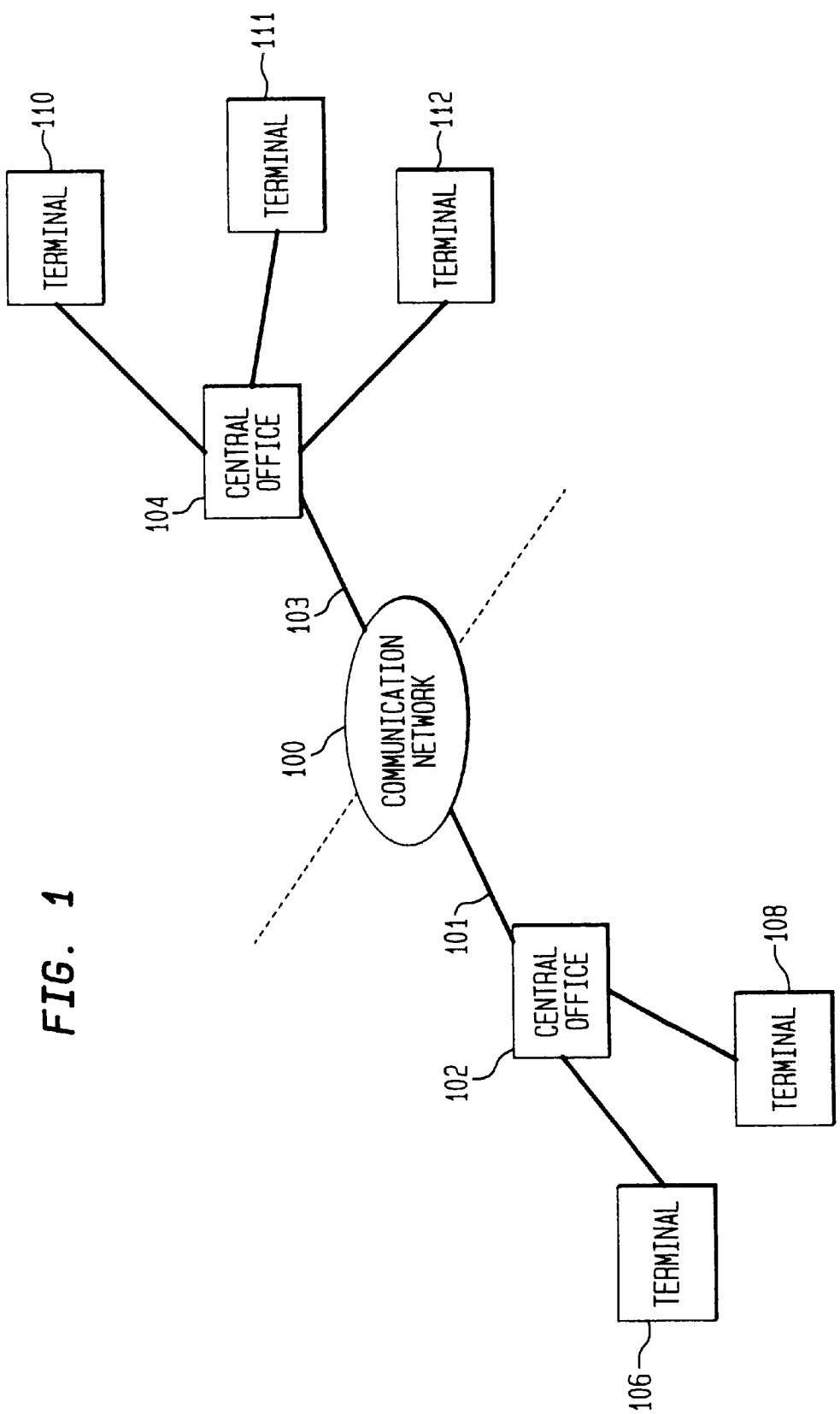
FIG. 1 is a diagram of a communication system.

FIG. 1 shows a communication system that includes a backbone communication network 100, central offices 102 and 104 and terminals 106–112. The terminals 106–112 may be personnel computers, entertainment terminals such as televisions, or telephone stations such as telephones.

The backbone communication network 100 may be fiber, wire or wireless systems. Trunks 101 and 103 forming the communication path between the central offices 102 and 104 and the backbone communication network 100 may be very high speed trunk lines. Currently, the communication paths between the central offices 102 and 104 and the respective terminals 106, 108 and 110, 111, 112 may be implemented by systems shown in FIGS. 2 and 3 and as discussed below.

Figure 2:
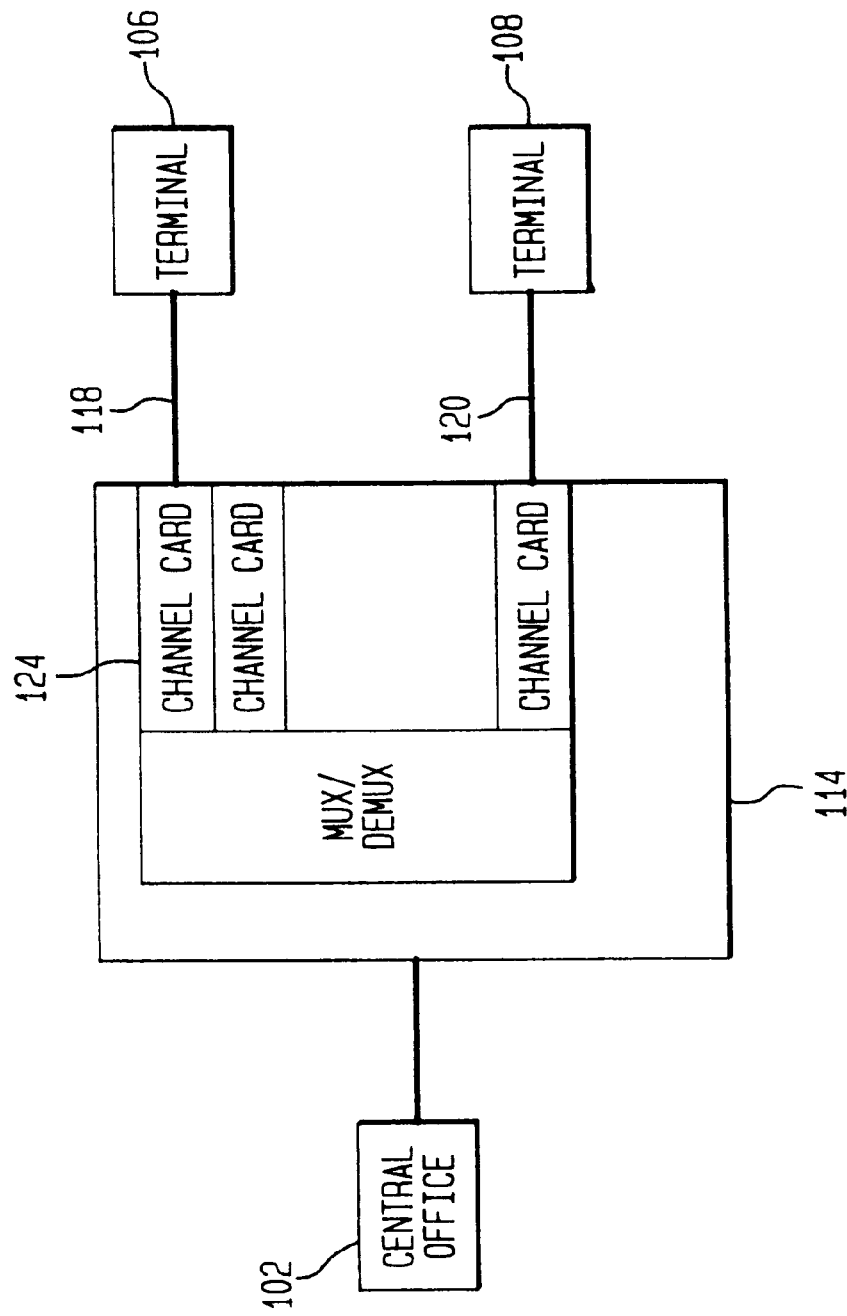
FIG. 2 is a block diagram showing a current communication system between a central office and end user terminals.

FIG. 2 is a block diagram of a current telephone system implementation that connects the central office 102 to the terminals (telephones) 106 and 108 through a pedestal 114. The pedestal 114 includes a channel bank 124 of channel cards where each of the channel cards is dedicated to one of the terminals such as terminals 106 and 108. Thus each channel card is used only as often as the corresponding terminal is used. Since terminals 106 and 108 are typically used less than 75% of the time, the channel cards of the channel bank 124 are extremely under-utilized. The above inefficient use of resources as well as associated complex management of dedicated lines such as twisted pairs 118 and 120 are improved upon by a hybrid fiber/coax (HFC) communication system shown in FIG. 3.

The HFC system provides for Time Division Multiplexing (TDM) which permits a group of end users to share one or more frequency channels. Because multiple end users may share a single frequency channel, each RF modem may support multiple end users. Thus, the channel bank 124 of channel cards may be replaced by a smaller number of RF modems.

Using the central office 104 as an example, the HFC system includes a head-end 105 which is coupled to a fiber node 128 through optical fiber 127. The fiber node 128 converts the optical signals received from the optical fiber 127 into electrical signals which are output to end users 140, 142 and 144 through coaxial networks. The coaxial signal line 131 is connected to the end users 140, 142 and 144 through amplifier 130, taps 134, 136 and 138, amplifier 132, coaxial signal lines 135, 137 and 139, and network interface units (NIU) 146, 148 and 150. Other taps and amplifiers downstream from tap 138 may also be connected to service additional end users.

The taps 134, 136 and 138 are passive devices as are the coaxial lines 135, 137 and 139. These passive devices may support bandwidths up to about 1 Ghz. However, amplifiers such as amplifiers 130 and 132 have bandwidths that varies between about 350 to 750 Mhz. Thus, bandwidth limitation of the amplifiers 130 and 132 limits the downstream bandwidth of this HFC system.

Upstream communication is made possible by enhancing the amplifiers to be bi-directional. However, upstream communication uses a frequency band from 5 to 40 Mhz and is susceptible to ingress noise.

The head-end 105 may include a broadcast portion that broadcasts a video signal to the end users 140, 142 and 144. Because of the shared-bus architecture and the bandwidth constraint described above, the HFC system uses TDM and Time Division Multiple Access (TDMA) for switched and narrowcast services.

Figure 3:
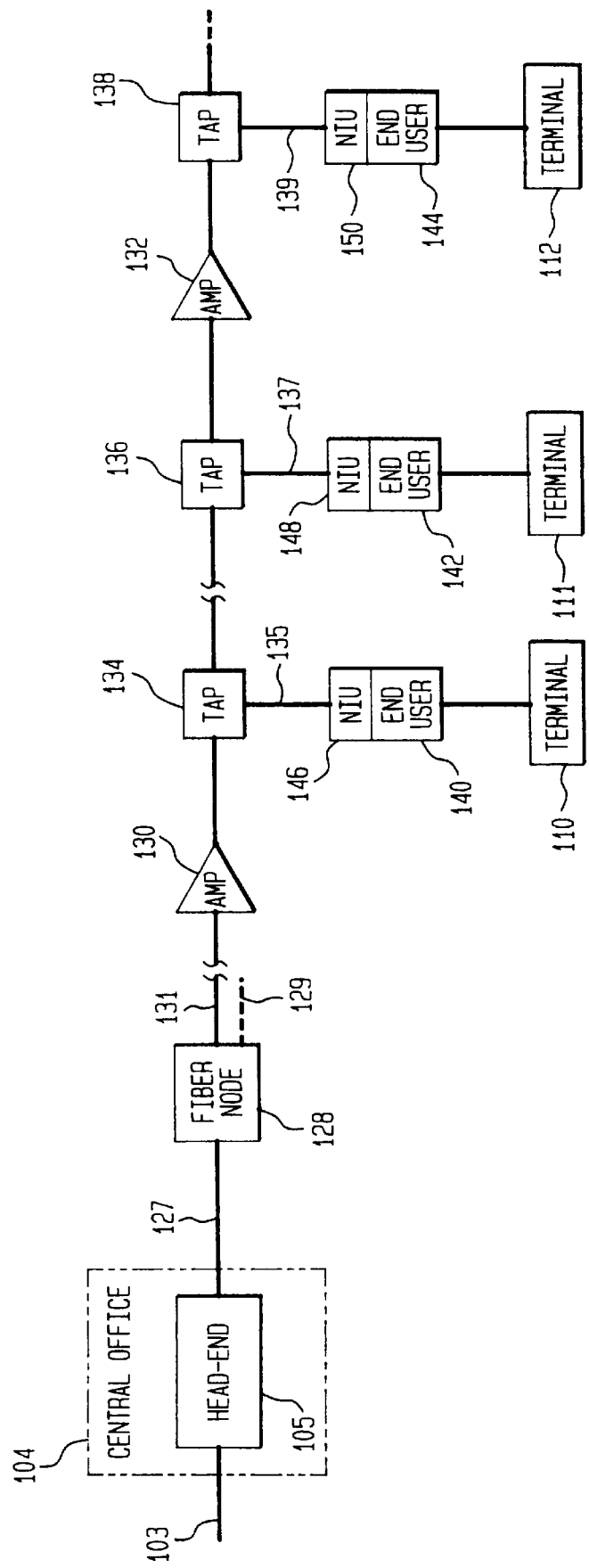
FIG. 3 is a block diagram of a hybrid fiber/coax communication system.
Figure 4:
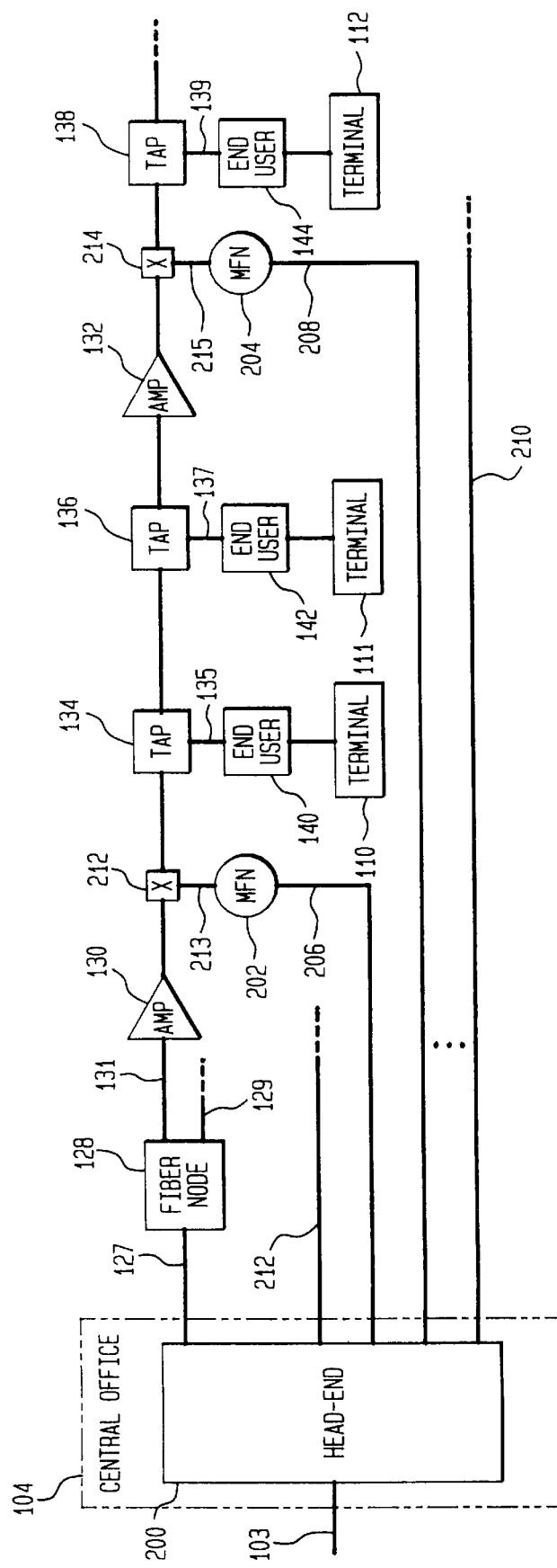
FIG. 4 is a block diagram of a hybrid fiber/coax system with mini-fiber nodes.

FIG. 4 shows an enhancement of the HFC system shown in FIG. 3. U.S. application Ser. No. 08,526,736 filed on Sep. 12, 1995, now abandoned, hereby incorporated by reference, provides a detailed description of the enhanced HFC system. In FIG. 4, the conventional HFC, shown in FIG. 3, is enhanced by adding mini-fiber nodes (mFN) 202 and 204, diplexers 212 and 214, and associated elements to support communication between the end users 140, 142, 144 and the central office 104 and the trunk 103 through the mFNs 202 and 204.

Each of the mFNs 202 and 204 is associated with one of the amplifiers 130 and 132. The mFN 202 is associated with the amplifier 130 and the mFN 204 is associated with the amplifier 132. The mFNs 202 and 204 are connected to the head-end 200 through optical fibers 206 and 208. Optical fibers 210 and 212 are connected to other mFNs that are not shown.

Mini-fiber nodes 202 and 204 provide both downstream and upstream communication through the optical fibers 206 and 208. The mFNs 202 and 204 utilize clean and wide bandwidths at high frequencies beyond limitations of the amplifiers 130 and 132, avoiding upstream ingress noise and without affecting existing HFC system. The diplexer 212, for example, sends an output signal to downstream end users 140 and 142 by combining the outputs of the amplifier 130 and the mFN 202. In addition, the diplexer 212 receives upstream communication from the end users 140 and 142 and sends the upstream communication to the mFN 202 to be output to the backbone communication network 100 through the optical fiber 206, the head-end 200 and the trunk 103.

The optical fibers 206 and 208 may include one optical fiber or two optical fibers. If one optical fiber is used, both downstream and upstream communication use the same optical fiber. If two optical fibers are included, one optical fiber may be dedicated to downstream communication and the other optical fiber dedicated to upstream communication.

FIG. 4 shows only two amplifiers 130 and 132, two mFNs 202 and 204, two diplexers 212 and 214, and three taps 134, 136, and 138. However, any number of each of the above elements may be included and the fiber node 128 may also output to other coaxial signal lines such as the coaxial signal line 129 which may include additional amplifiers, diplexers, mFNs, taps, etc. The number and type of elements depends on the application circumstances.

Because the mFNs 202 and 204 are coupled to the end users 140, 142 and 144 by only passive elements that have bandwidths of about 1 GHz, the usable bandwidth by end users 140, 142 and 144 is extended up to about 1 GHz without modifying the amplifiers 130 and 132. Thus, the mFNs 202 and 204 provide greater bandwidth unlimited by the bandwidths of amplifiers 130 and 132.

Since the frequency of the signals output by the mFNs 202 and 204 is well above the bandwidths of the amplifiers 130 and 132, the amplifiers 130 and 132 do not pass the signals handled by mFNs 202 and 204 for both downstream and upstream communications thus isolating the communication traffic of each of the mFNs 202 and 204. Filters (not shown) may also be placed before each of the amplifiers 130 and 132 to further filter out mFN signals from being transmitted downstream. This isolation permits each of the mFNs 202 and 204 to operate independently of other mFNs 202 and 204. Thus, the mFNs 202 and 204 may utilize different frequency bands or share a common frequency band for both downstream and upstream communications. This bandwidth re-use significantly increases the available bandwidth per end user.

FIG. 4 is an exemplary embodiment for an mFN application. Other mFN applications may also benefit from the present invention such as the Express architecture disclosed in the U.S. application Ser. No. 0,8526,736, now abandoned.

Figure 5:
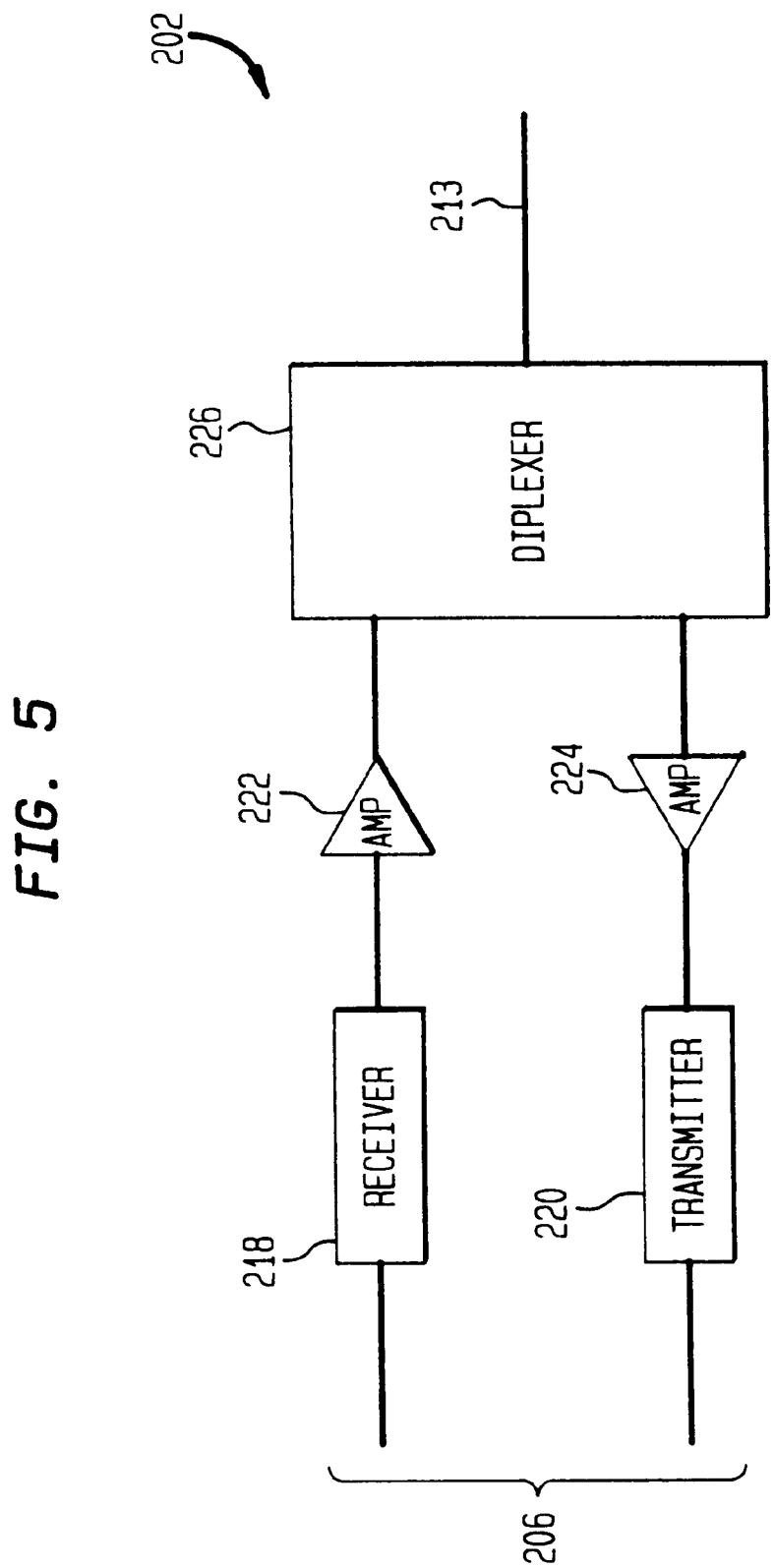
FIG. 5 is a block diagram of a mini-fiber node of FIG. 4.

FIG. 5 shows a block diagram of an exemplary embodiment of the mFN 202. The mFN 202 includes a receiver path and a transmitter path connected to a diplexer 226. The receiver 218 receives optical signals from the optical fiber 206 and converts the optical signals into electrical signals which are amplified by amplifier 222 and input into the diplexer 226. The diplexer 226 outputs the electrical signals directly to the diplexer 212. The diplexer 226 receives electrical signals from the diplexer 212 and outputs these signals to the amplifier 224. The amplifier 224 outputs the signals to the transmitter 220 and the transmitter 220 converts the electrical signals into optical signals and outputs the optical signals onto optical fiber 206. The diplexer 212 may be included in the mFN 202.

In summary, the mFNs 202 and 204 provide significant advantages such as clean and wide bandwidths resulting in greater bandwidth per end user 140, 142 and 144. Because one mFN 202 and 204 is associated with one amplifier 130 and 132, the number of end users 140, 142 and 144 served by each mFN 202 and 204 is much smaller than the number of end users 140, 142 and 144 served by the fiber node 128. Thus, the bandwidth per mFN 202 and 204 serves fewer end users 140, 142 and 144.

Moreover, due to bandwidth sharing made possible by mutual isolation of the mFNs 202 and 204, further additional bandwidth per end user 140, 142 and 144 is provided. This bandwidth increase allows the mFNs 202 and 204 to operate using Frequency Division Multiplexing/Frequency Divisions Multiple Access (FDM/FDMA) protocol instead of the more complex TDM/TDMA protocol. Thus, head-end 200 is less complex than the head-end 105. Benefits of the above described mFN-HFC system may be applied to services such as telephony, data and entertainment services. In particular, one application is a simple telephone service.

Figure 6:
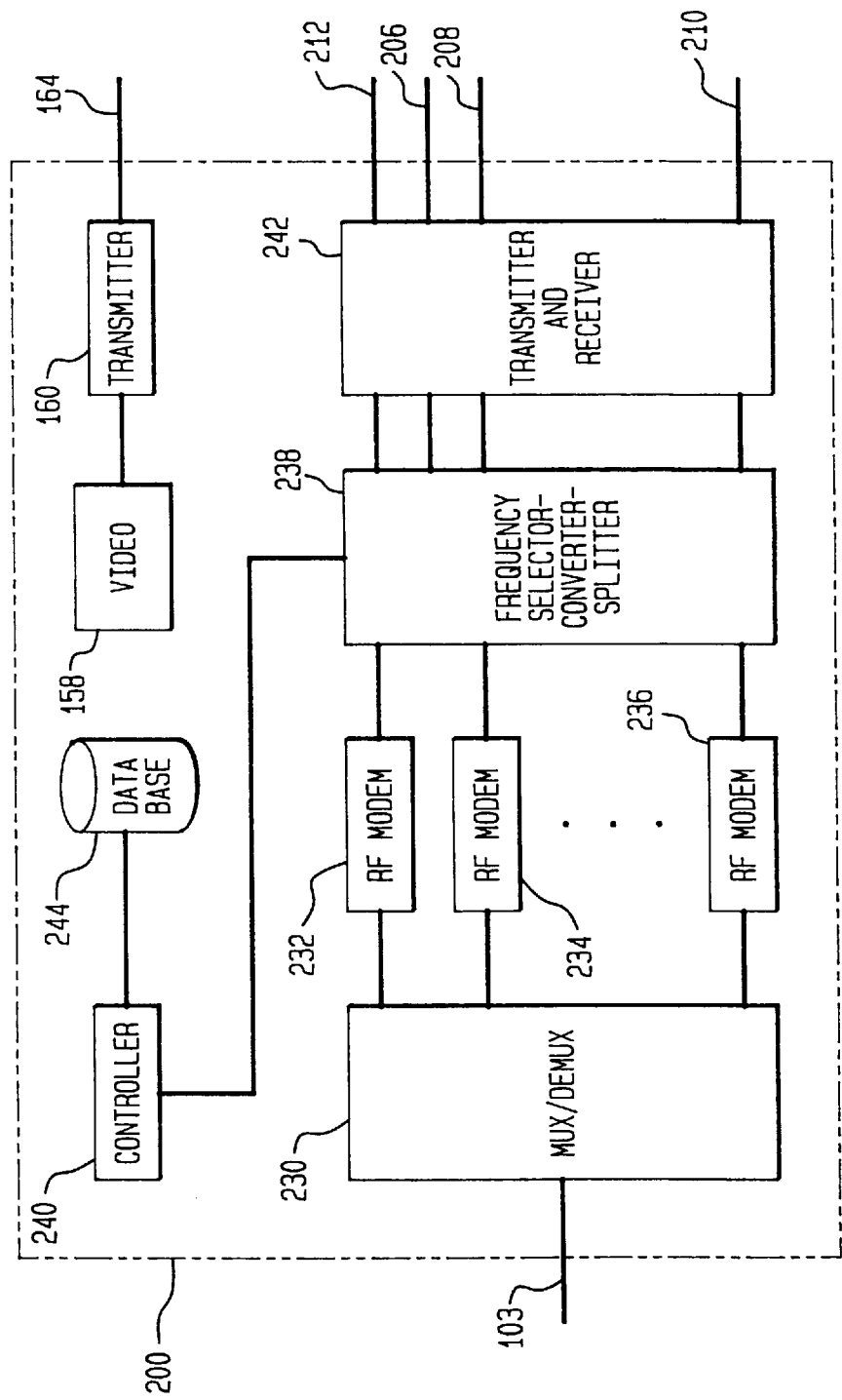
FIG. 6 is a block diagram of a head-end of FIG. 4.

Because FDM/FDMA permits independent resource allocation for each end user 140, 142 and 144, resource sharing for the head-end 200 may be effectively achieved. For example, FIG. 6 shows an exemplary embodiment of the head-end 200. The head-end 200 includes a mux/demux 230 connected to the trunk 103. The mux/demux 230 is connected to a pool of RF modems such as RF modems 232, 234 and 236. The RF modems 232, 234 and 236 are also connected to a frequency selector-converter-splitter 238 which is connected to the optical fiber 212, 206, 208 and 210 through transmitter and receiver block 242.

The mux/demux 230 demultiplexes the data received from the trunk 103 into signals addressed to each end user. The demuxed signals are modulated onto an intermediate frequency carrier using modulation schemes such as Quadrature Phase Shift Keying (QPSK), Binary Phase Shift Keying (BPSK), or Quadrature Amplitude Modulation (QAM) by the RF modems 232, 234 and 236. The outputs of the RF modems 232, 234 and 236 are directed by the frequency selector-converter-splitter 238 to the mFNs 202 and 204 through the optical fibers 206 and 208.

When a call is received for an end user 140, for example, the head-end 200 allocates one channel that is dedicated to the end user 140 for this call. To support the dedicated channel assigned to the end user 140, one of the RF modems 232, 234 and 236 is allocated for the dedicated channel. The output of the allocated RF modem is routed to the mFN 202 that serves the end user 140. Thus, the RF modems 232, 234 and 236 is allocated to the mFNs 202 and 204 to modulate the demuxed signals that is addressed to the end users 140, 142 and 144 served by the mFNs 202 and 204. The allocation of the modems 232, 234 and 236 to the mFNs 202 and 204 is controlled by a controller 240.

The allocation of the RF modems 232, 234 and 236 to the mFNs 202 and 204 may be determined by either a predetermined plan or a dynamic allocation plan where the RF modems are allocated based on end user requirements (i.e., whether a particular end user served by an mFN has any communication traffic). In either of the above cases, the allocation information is stored in a data base 244 which is also controlled by the controller 240.

Figure 7:
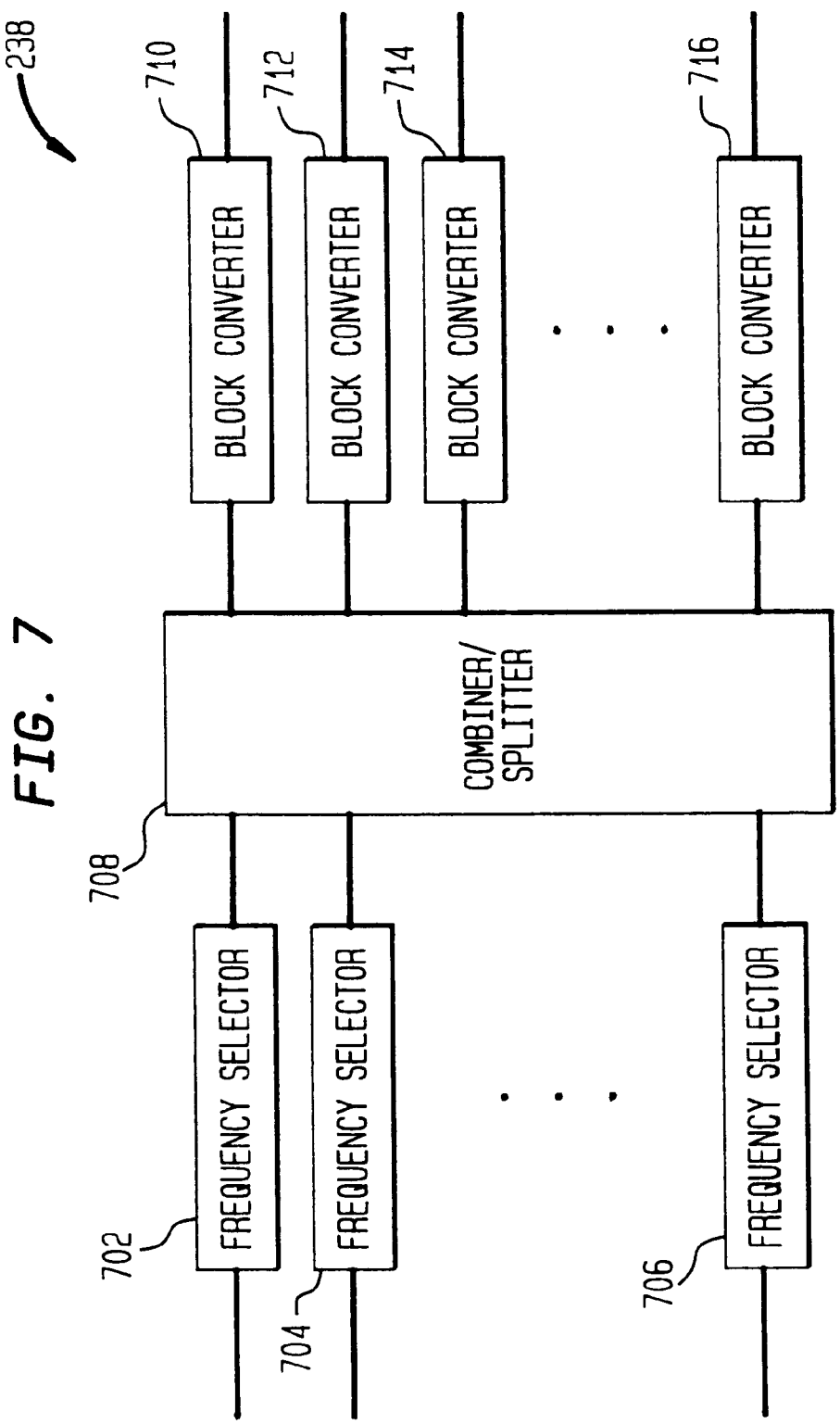
FIG. 7 is a block diagram of a frequency selector-converter-splitter of FIG. 6.

FIG. 7 is a block diagram of an exemplary embodiment for the frequency selector-converter-splitter 238. The frequency selector-converter-splitter 238 maps in frequency the input/output signals of the RF modems 232, 234 and 236 and the mFNs 202 and 204. In the upstream direction, because the mFNs 202 and 204 may overlap or share the common frequency band, the mFN output signals are block converted by block converters 710, 712, 714 and 716 into different frequency bands before input to a combiner/splitter 708. The combiner/splitter 708 combines all the block converted frequency bands and outputs the combination to each of the frequency converters 702, 704 and 706. The output signals of the combiner/splitter 708 are frequency converted by frequency selectors 702, 704 and 706 to intermediate frequency signals before received as inputs by the RF modems 232, 234 and 236.

In the downstream direction, the intermediate frequency signals output from the RF modems 232, 234 and 236 are frequency converted by the frequency selectors 702, 704 and 706 to selected frequencies based on the addressed end user. In addition, the frequency selectors 702, 704 and 706 further convert the selected frequencies to the frequency band allocated to the respective mFNs 202 and 204 to avoid frequency overlap of the mFN signals. The outputs of the combiner/splitter 708 are block converted by the block converters 710, 712, 714 and 716 from the allocated frequency band for each of the mFNs 202 and 204 to the frequency bands or the common frequency band used by the mFNs 202 and 204.

Other head-end resource allocation schemes than that described above are also possible. The frequency-selector-converter-splitter 238 may be easily adapted based on other schemes to map the RF modems 232, 234 and 236 onto the mFNs 202 and 204 to optimize utilization of the RF modems 232, 234 and 236, the mFNs 202 and 204, the frequency bands used by the mFNs 202 and 204 and the channels assigned to end users 140, 142, and 144.

FIG. 6 shows an RF modem organization that provides a pool of the RF modems 232, 234 and 236. When an end user served by one of the mFNs 202 and 204 requests a channel, one of the RF modems 232, 234 and 236 of the pool is allocated to the mFN 202 and 204 serving the requesting end user. Thus, the number of required RF modems 232, 234, and 236 may be reduced to a number that provides a level of communication service availability that is desired. Accordingly, pooling the RF modems 232, 234 and 236 exploits RF modem resources and increases RF modem utilization.

Figure 8:
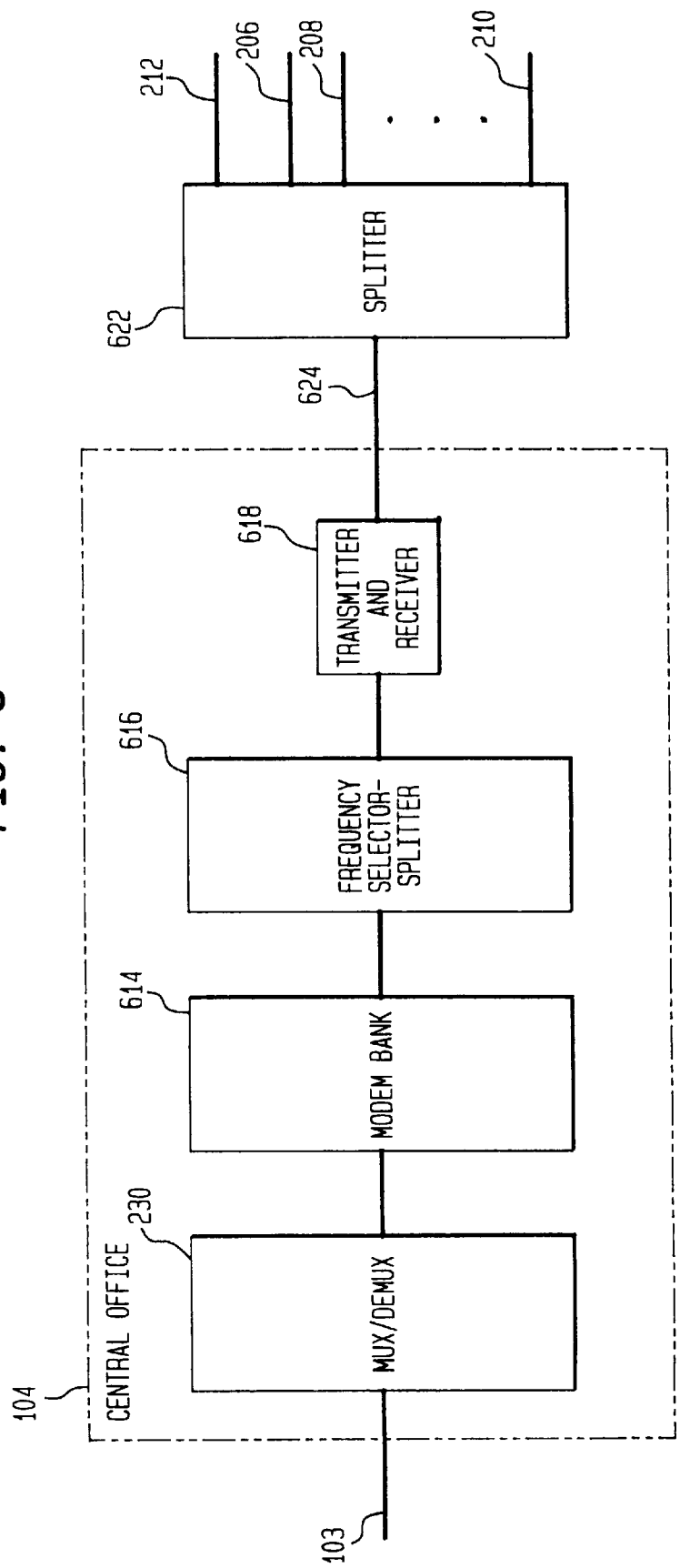
FIG. 8 is a block diagram of a modem bank organization for the head-end of FIG. 6.

FIG. 8 shows a modification of the mFN connection to the head-end 200 of FIG. 6. All of the RF modems 232, 234 and 236 are pooled together in one modem bank 614 and the modem bank 614 is coupled to an optical fiber 624 through a frequency selector-splitter 616 and a transmitter and receiver 618. The optical fiber 624 may be a single fiber or a pair of fibers where one fiber serves downstream communication traffic and the other fiber serves upstream communication traffic. All of the mFNs 202 and 204 are connected to the optical fiber 624 through a splitter 622. The splitter 622 is optional because the mFNs 202 and 204 communicate on the optical fiber 624 using different frequency bands as further discussed below. Thus, the above modification connects a cluster of mFNs 202 and 204 to the central office 104 through the optical fiber 624.

Figure 9:
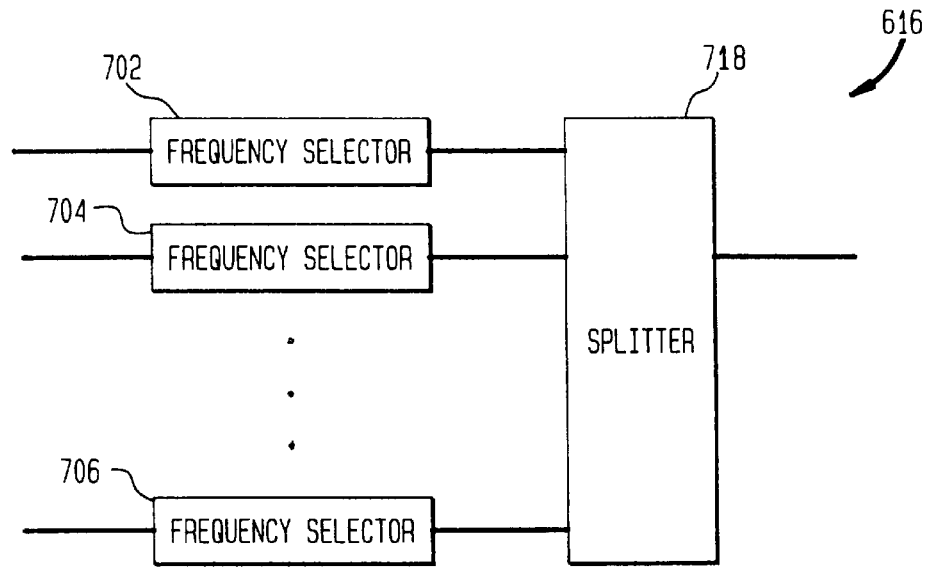
FIG. 9 is a block diagram of a frequency selector-converter of FIG. 8.

FIG. 9 shows that the frequency selector-splitter 616 includes frequency selectors 702, 704 and 706 and a splitter 718. The frequency selector-splitter 616 is similar to the frequency selector-converter-splitter 238 except that the block converters 710, 712, 714 and 716 are not needed. Because all the mFN signals are transmitted or received on the optical fiber 624, the mFN signals are mapped into the allocated frequency bands by the frequency selectors 702, 704 and 706 and the transmitters 220 of the mFNs 202 and 204. The frequency selectors 702, 704 and 706 and the mFN receivers 218 receive signals from the allocated frequency bands. The frequency selectors 702, 704 and 706 convert the received signals into the intermediate frequencies for the RF modems 232, 234 and 236. The mFNs 202 and 204 convert the received signals to the respective frequency bands used by each mFN 202 and 204 or to the common frequency band used by all the mFNs 202 and 204.

The organization of FIG. 8 is advantageous for circumstances where optical fiber allocations for central office and mFN connections are very limited. For example, if mFN upgrades are applied to existing systems having only one available optical fiber between the central office 104 and mFNs 202 and 204, then the organization of FIG. 8 could be used.

While signals of all the mFNs 202 and 204 are combined and transmitted on the optical fiber 624, each of the mFNs 202 and 204 maintains independent channels. Thus, while only one optical fiber 624 is used, the logical function of the system as shown in FIG. 8 is the same as that shown in FIG. 6. Also, the block converters 710, 712, 714 and 716 and the frequency selectors 702, 704 and 706 may include other elements such as filters. FIGS. 7 and 9 show only logical functions.

FIG. 10 shows the RF modems 232, 234 and 236 organized into modem banks 602, 604 and 606. Each of the modem banks 602, 604 and 606 is coupled to an optical fiber bus such as optical fiber buses 206, 208 and 210 through frequency selector-splitters 608, 610 and 612 and transmitter/receivers 624, 626 and 628, respectively. The frequency selector-splitters 608, 610 and 612 perform the same functions as the frequency selector-splitter 616 shown in FIG. 9. In the above organization, each of the modem banks 602, 604 and 606 is allocated to one of the mFNs 202 and 204. If the mFNs 202 and 204 are geographically located, the above organization guarantees that each geographic location has one bank of modems so that every geographical area is provided access to the backbone communication network 100 without being affected by the communication traffic volume of other geographical areas.

Figure 11:
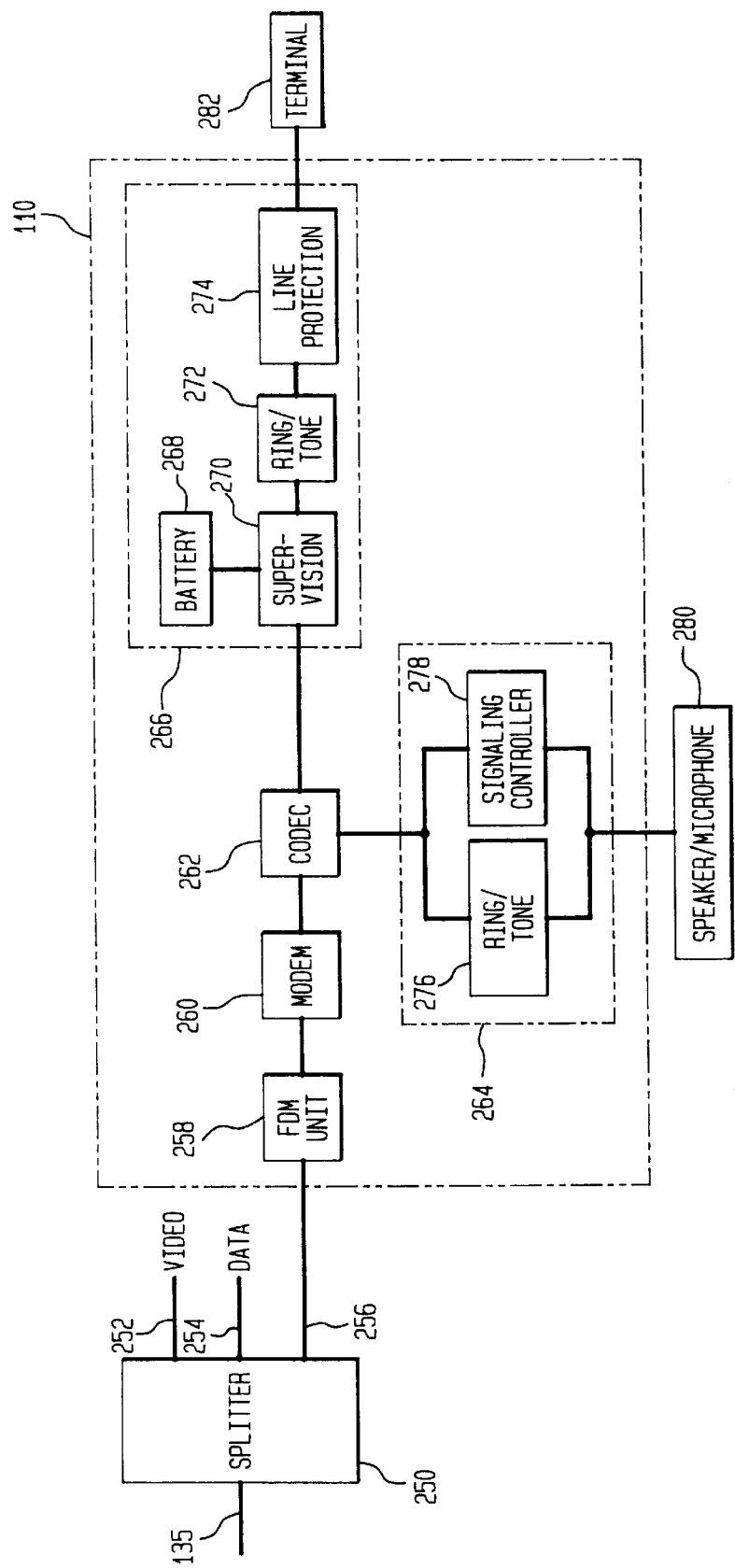
FIG. 11 is a diagram of a terminal that communicates with the head-end of FIG. 4 via frequency division multiplexed signals.

FIG. 11 shows a block diagram of an exemplary embodiment of the terminal 110 for the end user 140 that directly interfaces with the mFN 202 for telephone services. As shown in FIG. 4, the mFN 202 is coupled to the coaxial signal line 135, through the diplexer 212 and the tap 134. The coaxial signal line 135 is a direct connection to the end user 140 and is connected to a splitter 250 located at the end user location. The splitter 250 splits out at least three kinds of signals; (1) the broadcast video signal which is output on signal line 252; (2) data signals, for Internet Communications, for example, are output and received on signal line 254; and (3) voice communication signals such as telephone communication are transmitted and received on signal line 256. Because the mFN 202 transmits and receives voice communication signals using the FDM/FDMA protocol, for example, the terminal 110, such as a telephone station, must interface with the mFN 202 by transmitting and receiving the voice communication signals in the FDM format.

Thus, the terminal 110 includes an FDM unit 258 connected to a coder/decoder (codec) 262 through a modem 260. RF signals received from the mFN 202 are received by the FDM unit 258 and sent to the modem 260 which converts the signal into a form required by the codec 262. The codec 262 is connected to a speaker/microphone controller 264 which directly interfaces with the speaker/microphone 280 used by a user. The speaker/microphone controller 264 includes a ring/tone generator 276 and a signaling controller 278 that interfaces with the codec 262 to control the operation of the ring/tone generator 276 and the speaker/microphone 280.

The terminal 110 (a telephone station for this example) also includes a conventional telephone interface 266 that interfaces with a terminal 282 that is a conventional telephone station. Because conventional telephone stations require twisted pairs interfaced to a channel card as shown in FIG. 2, the conventional terminal interface 262 performs the function of a channel card which includes a supervision unit 270, a battery 268, a ring/tone generator 272 and a line protection unit 274. Thus, the terminal 110 serves as a telephone station for a user to engage in voice communications directly through the speaker/microphone 280 as well as provides an interface for conventional telephone stations such as terminal 282 so that conventional telephone stations that a user may have can also be used.

FIG. 12 is a representative diagram of frequency channels in a FDM protocol. Under FDM, the bandwidth is divided into frequency channels such as frequency channels 302, 304, 306 and 308. Each of these frequency channels may be allocated to one of the end users 140, 142 and 144. However, because a specific end user may not utilize the allocated frequency channel 100% of the time, the frequency channels can be viewed as a pool of channels that may be allocated to an end user on a demand basis.

Additional channels may be obtained by further dividing each frequency channel in time by time division multiplexing (TDM). Thus, as shown in FIG. 13, a plurality of time slots such as time slot 402, 404 and 406 may be defined for frequency channel 310. When TDM and FDM protocols are used together, a channel allocated to an end user is a particular time slot of a particular frequency channel such as time slot 402 of frequency channel 310. Thus, when TDM and FDM are used together, the bandwidth of a mFN 202 and 204 is used more efficiently.

As discussed earlier, each of the channels may be preassigned to end users 140, 142, and 144 based on a predetermined plan. However, if the channels are assigned dynamically, the effective bandwidth may be further increased. However, dynamic allocation of channels requires additional protocols to determine channel allocation. Three alternative channel allocation protocols are discussed below and may be used to perform such channel allocations.

For all three alternative protocols, the channels are first paired. One of each pair of channels is dedicated to downstream communication while the other of the pair of channels is dedicated to upstream communication. Thus, once a channel is allocated to an end user, both upstream and downstream channels are provided. In the following discussion, a channel will mean a pair of downstream/upstream channels. Protocols may also be implemented that allocates upstream and downstream channels separately.

Figure 14:
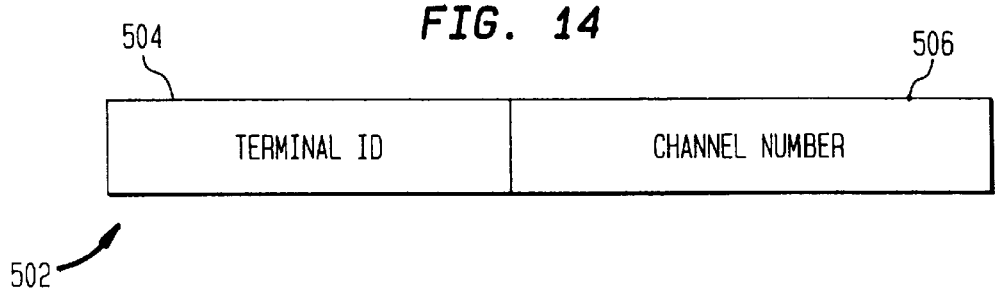
FIG. 14 is a diagram of an alert message.

For voice communication using telephones, for example, terminal 110 is a telephone station. When a call for the end user 140 is received by the head-end 200, the head-end controller 240 determines 1) which of the mFNs 202 and 204 serves the end user 140 and 2) a terminal ID addressed by the call. The above information is stored in the data base 244. In this case the terminal ID is the identification number for the telephone station 110 such as a telephone number. The head-end controller 240 assigns a free channel to the call and formats the terminal ID and a channel number of the free channel into an alert message. The free channel is a frequency channel or a time slot of a frequency channel that is not used for other purposes. An alert message 502 is shown in FIG. 14.

The alert message 502 is transmitted downstream to the end user 140 on a preassigned signaling channel, for example. This signaling channel is not paired with another channel, but specifically allocated for the head-end controller 240 to send signaling information to all or a group of the end users 140, 142 and 144. All terminals of the end users 140, 142 and 144 monitor the signaling channel and a terminal addressed by the terminal ID 504 in the alert message 502 responds to the alert message 502 by executing appropriate processes. Thus, when the telephone station 110 detects its terminal ID 504 in the alert message 502, the telephone station 110 outputs a "ring" through either the speaker of the speaker/microphone unit 280 or through the ring/tone generator 272 to a ring device of the terminal 282. If the call is answered by taking the telephone station 110 or the terminal 282 off-hook, the telephone station 110 establishes a communication path through the channel having the channel number 506 received in the alert message 502.

If the telephone station 110 is used to make a call by taking the telephone station 110 or the terminal 282 off-hook, the telephone station 110 must acquire an available channel through which to communicate before a dial tone can be output through the speaker of the speaker/microphone unit 280 or through the ring/tone generator 272 to the terminal 282. The telephone station 110 may acquire a channel by scanning through all possible channels to search for a "quiet" channel. A quiet channel is a channel that has no signal.

Once the quiet channel is located, the telephone station 110 may issue a channel request to the head-end 200 for using the located quiet channel. The channel request 508 may be issued upstream to the head-end controller 240 on the quiet channel.

Figure 15:
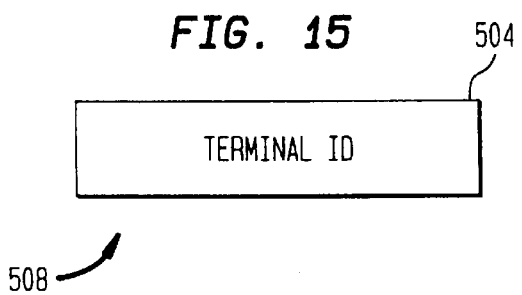
FIG. 15 is a diagram of a channel request.

An example of the channel request 508 is shown in FIG. 15. The channel request 508 contains only the terminal ID 504. The terminal ID 504 identifies the telephone station 110 so that the head-end controller 240 may assign an RF modem such as RF modems 232, 234 and 236 to the terminal ID 504 and route all data coming from the trunk 103 addressed to the terminal ID 504 to the allocated RF modem.

The head-end may assign the quiet channel to the telephone station 110 by a loop-back process where the channel request 508 received on the upstream side of the quiet channel is looped back through the downstream side of the quiet channel to inform the telephone station 110 that the channel request 508 is granted. When the terminal ID 504 is detected on the downstream side of the quiet channel and matches the terminal ID of the telephone station 110, the telephone station 110 outputs a dial tone through the speaker of the speaker/microphone 280 or the terminal 282. The head-end may also loop-back the channel request 508 on a downstream signaling channel preassigned to the head-end 200.

If multiple channel requests are received from different terminal IDs including terminal ID 504 for the same channel number 506, then the loop-back process returns a combination of all the terminal IDs. Thus, none of the terminals will detect their specific terminal ID 504 and each terminal will search again for another quiet channel followed by another channel request 508. Each terminal repeats the above process until a channel is successfully obtained, or if unsuccessful for a preset number of tries, outputs a busy signal through the speaker of the speaker/microphone 280 or the telephone station 282.

The head-end controller 240 may respond to a channel request 508 by explicitly assigning the quiet channel to the requesting terminal such as telephone station 110. The head-end controller 240 assigns the quiet channel to one of the terminal IDs by returning a granted message to the selected terminal ID 504 through either the quiet channel or the preassigned downstream signaling channel. After receiving the grant message, the telephone station 110 proceeds with the communication process by outputting the dial tone through the speaker of the speaker/microphone 280 or conventional telephone station 282.

If a grant message is not received for a predetermined amount of time, for example, the telephone station 110 may search for another quiet channel and repeat the channel request process. If a grant message is not received after a preset number of requests, the telephone station 110 may output a busy signal so that a user may be alerted that communication service cannot be provided at this time.

An alternative protocol would be as follows: the head-end controller 240 broadcasts channel availability information through the downstream signaling channel. This would alleviate the telephone station 110 from searching for a quiet channel which may cause undesirable delay. When the telephone station 110 goes off-hook, an available channel may be quickly determined by listening to the downstream signaling channel and a channel request 508 may be sent using the available channel or an upstream signaling channel that is preassigned for this purpose. If either the loop-back terminal ID or a grant message is received through either the downstream signaling channel or the available channel, the telephone station 110 may output a dial tone. Otherwise, the telephone station 110 may select another available channel by listening to the downstream signaling channel and issue another channel request 508. This process can continue until the head-end 200 indicates that no channels are available.

In a third alternative, the head-end 200 generates an availability signal on one of the channels. When off-hook, the telephone station 110 searches for the channel having the availability signal and transmits a channel request 508 using that channel or the upstream signaling channel. If the available channel is allocated to the telephone station 110, the head-end will either loop-back the terminal ID or send the grant message to the telephone station 110 through the available channel or the downstream signaling channel. After receiving either the loop-back terminal ID or the grant message, the telephone station 110 may proceed to output a dial tone. However, if either the loop-back terminal ID or the grant message is not received, the telephone station 110 may search for the next channel selected by the head-end 200 as the available channel. After the telephone station 110 occupy the available channel, the head-end 200 selects another channel and generates the availability information on the selected channel and the above process repeats.

FIG. 16 shows a flow-chart of the channel allocation process discussed above. In step S1000, the telephone station 110 determines an available channel by one of the above three alternative methods. Then the process goes to step S1002. In step S1002, the telephone station 110 sends a channel request on the available channel or a signaling channel. Then the telephone station 110 goes to step S1004.

In step S1004, the telephone station 110 waits for a grant message from the head-end 200 and then goes to step S1006. In step S1006, the telephone station 110 determines whether a grant message was received. If a grant message was received, the telephone station 110 goes to step S1008. Otherwise, the telephone station 110 goes to step S1010.

In step S1010, the telephone station 110 increments a count and goes to step S1012. In step S1012, the telephone station 110 determines whether the count exceeded a maximum. If the count exceeded a maximum, the telephone station 110 goes to step S1014. Otherwise, the telephone station 110 returns to step S1000.

In step S1014, the telephone station indicates that a channel is not available for communication by generating a busy tone, for example. Then the telephone station 110 goes to step S1016 and ends the process. In step S1008, the telephone station 110 indicates that a channel is available by generating a dial tone, for example, and goes to step S1016 and ends the process.

While the invention has been described in conjunction with the specific embodiments outlined above, it is evident that many alternatives, modifications and variations will be apparent to those skilled in the art. For example, the present invention may be applied to any passive point to multipoint optical networks. Telephony, data and entertainment communication services may be provided on these networks which may benefit from the resource and channel allocation techniques of the present invention.

In addition, while FDM and/or TDM protocols are used as examples, other protocols such as Code Division Multiplexing (CDM) and Wavelength Division Multiplexing (WDM) may also be used and gain similar benefits. Accordingly, the preferred embodiments of the invention as set forth above are intended to be illustrative, not limiting various changes may be made without departing from the spirit and scope of the invention as defined in the following claims.

What is claimed is:

1. A communication system in a network, comprising:
   a plurality of nodes;
   a head-end coupled to the nodes, the head-end including:
   a controller;
   a plurality of network interface units; and
   a pooling unit, wherein the pooling unit maps communication signals received from the nodes into combined signals based on resource allocation information generated by the controller, each of the combined signals being transmitted to the network through one of the network interface units.

2. The communication system of claim 1, wherein the network interface units are coupled to the nodes through a signal physical connection.

3. The communication system of claim 1, wherein each of the nodes are associated with a corresponding plurality of end users, the nodes communicating information with the corresponding plurality of end users using a common frequency band.

4. The communication system of claim 1, wherein the controller assigns a channel to an end user based on a predetermined plan.

5. The communication system of claim 1, wherein an end user sends a channel request to the controller and the controller grants a channel to the end user based on the channel request.

6. The communication system of claim 5, wherein the end user searches for a quiet channel and sends the channel request to the controller on one of the quiet channel and a signaling channel, the controller sending a grant message to the end user on one of the quiet channel and the signaling channel to grant the quiet channel to the end user.

7. The communication system of claim 5, wherein the controller broadcasts available channel information on a signaling channel, the end user selecting an available channel as a selected channel and sending the channel request to the controller on one of the selected channel and the signaling channel, the controller sending a grant message to the end user to grant the selected channel to the end user.

8. The communication system of claim 5, wherein the controller broadcasts available channel information on a head-end channel, the end user sending the channel request to the on one of the head-end channel and a signaling channel, the control unit sending a grant message to the end user to grant the head-end channel to the end user.

9. The communication system of claim 5, wherein the channel includes a downstream channel and an upstream channel, the end user receiving information from the controller through the downstream channel and sending other information to the controller through the upstream channel.

10. The communication system of claim 5, wherein if the controller does not grant the channel to the end user, then the end user sends another channel request to the controller or generates a busy signal.

11. The communication system of claim 5, wherein the controller loops back channel requests received on the channel, the channel being granted to the end user if the channel request sent by the end user is also received by the end user on the channel.

12. The communication system of claim 5, wherein the controller receives the channel request from the end user and other channel requests from other end users, if more than one end user requests the channel, the controller selecting one of the more than one end user and grants the channel to the selected end user.

13. The communication system of claim 5, wherein the controller allocates one of the network interface units to a node associated with the end user if a network interface unit is not already allocated to the node, the controller storing a correspondence between the allocated one of the interface units and the node as well as a correspondence between the end user and the granted channel in a memory device.

14. The communication system of claim 5, wherein the controller routes communications addressed to the end user through the allocated one of the network interface units on the granted channel.

15. The communication system of claim 1, wherein the controller and the nodes are coupled by an optical fiber.

16. A method for operating a communication system, comprising:
    transferring information between a control unit and a plurality of nodes, the information being transferred between the control unit and each of the plurality of nodes through at least one dedicated channel; and
    allocating at least one of a plurality of banks of interface units to each of the nodes, wherein communication signals received from the nodes are mapped to at least one interface unit banks as combined signals.

17. A method for operating a communication system, comprising:
    transferring information between a control unit and a plurality of nodes, the information being transferred between the control unit and each of the plurality of nodes through at least one dedicated channel; and
    allocating at least one of a plurality of interface units to any one of the nodes, wherein communication signals received from the nodes are mapped to at least one interface unit as combined signals.

18. The method of claim 17, further comprising:
    coupling the interface units to the nodes through a single physical connection.

19. The method of claim 17, further comprising:
    transferring data between the nodes and a plurality of end users associated with each of the nodes, wherein the data is transferred using a common frequency band.

20. The method of claim 17, further comprising:
    assigning a channel to an end user associated with one of the nodes based on a predetermined plan.

21. The method of claim 17, further comprising:
    sending a channel request to the control unit to request a channel; and
    granting the channel to an end user based on the channel request.

22. The method of claim 21, further comprising:
    searching for a quiet channel, wherein the channel request is sent on one of the quiet channel and a signaling channel, the control unit granting the quiet channel to the end user by sending a grant message on one of the quiet channel and the signaling channel.

23. The method of claim 21, further comprising:
    broadcasting available channel information on a signaling channel, wherein the end user selects an available channel as a selected channel and sends the channel request on one of the selected channel and the signaling channel, the control unit sending a grant message to the end user to grant the selected channel to the end user.

24. The method of claim 21, further comprising:
    broadcasting available channel information on a head-end channel, wherein the end user sending the channel request to the control unit on one of the head-end channel and a signaling channel, the control unit sending a grant message to the end user to grant the head-end channel to the end user.

25. The method of claim 21, further comprising:

sending another channel request to the control unit if the control unit does not grant the channel to the end user.

26. The method of claim 21, further comprising:

generating a busy signal if the control unit does not grant the channel to the end user.

27. The method of claim 21, further comprising:

receiving the channel request from the end user and other channel requests from other end users, wherein if more than one end user requests the channel, the control unit selects one of the more than one end user and grants the channel to the selected end user.

28. The method of claim 21, further comprising:

looping back channel requests received on the channel, the channel being granted to the end user if the channel request sent by the end user is received by the end user on the channel.

29. The method of claim 21, further comprising:

allocating one of the interface units to a node associated with the end user if an interface unit is not already allocated to the node; and storing a correspondence between the allocated one of the interface units and the node as well as a correspondence between the end user and the granted channel in a memory device.

30. The method of claim 21, further comprising:

routing communications addressed to the end user through the allocated one of the interface units on the granted channel.

31. A communication system in a network, comprising:

a plurality of nodes;

a head-end coupled to the nodes, the head-end including:
  a controller;
  a plurality of banks of network interface units; and
  a pooling unit, wherein the pooling unit maps communication signals received from the nodes into combined signals based on resource allocation information generated by the controller, each of the combined signals being transmitted to the network through one of the network interface units.

\* \* \* \* \*